United States Patent [19]

Daigle et al.

[11] Patent Number: 4,973,014
[45] Date of Patent: Nov. 27, 1990

[54] CONDUIT BRACKET LOCK SYSTEM

[75] Inventors: Robert V. Daigle, Deerfield Beach, Fla.; Gordon J. Grice, Janesville, Wis.

[73] Assignee: Creative Systems Engineering, Inc., Janesville, Wis.

[21] Appl. No.: 465,364

[22] Filed: Jan. 16, 1990

Related U.S. Application Data

[63] Continuation-in-part of Ser. No. 354,806, May 22, 1989, Pat. No. 4,911,387, which is a continuation-in-part of Ser. No. 211,967, Jun. 27, 1988, Pat. No. 4,901,957.

[51] Int. Cl.⁵ .............................................. F16L 3/00
[52] U.S. Cl. ...................................... 248/62; 248/65; 248/74.4
[58] Field of Search ............... 248/62, 74.1, 74.2, 248/74.3, 74.4, 74.5, 65, 73, 49, 58, 63, 343; 239/209; 138/107

[56] References Cited

U.S. PATENT DOCUMENTS

| | | | |
|---|---|---|---|
| 3,464,172 | 9/1969 | McGee, Jr. | 239/209 |
| 3,539,137 | 11/1970 | March | 248/62 |
| 4,058,167 | 11/1977 | Granek et al. | 239/450 X |
| 4,079,786 | 3/1978 | Moling | 239/209 X |
| 4,252,289 | 2/1981 | Herb | 248/62 |
| 4,330,040 | 5/1982 | Ence et al. | 239/209 X |
| 4,653,716 | 3/1987 | Sakaguchi | 248/74.5 X |
| 4,795,114 | 1/1989 | Usui et al. | 248/62 |
| 4,901,957 | 2/1990 | Daigle et al. | 248/62 |
| 4,911,138 | 3/1990 | Daigle et al. | 248/62 |

FOREIGN PATENT DOCUMENTS

| | | | |
|---|---|---|---|
| 1272412 | 7/1968 | Fed. Rep. of Germany | 248/74.2 |
| 0835605 | 5/1960 | United Kingdom | 248/74.4 |

*Primary Examiner*—Ramon O. Ramirez
*Attorney, Agent, or Firm*—Melvin K. Silverman

[57] ABSTRACT

A conduit bracket lock system includes a constructional surface engagement element having radially projecting elements for nestingly resiliently engaging a conduit, the engaging elements comprising, at respective ends, an integral cover plate holding element having, in radial cross-section, a substantially circular profile. The system further includes a reverse curvature hinge integrally depending from, and resiliently biased toward, a non-engaging side of the engagement element and, proximally to one of the holding elements, the hinge defining, in radial cross-section, a substantially circular loop curving initially away from the engaging elements and away from the one proximal holding element and, at the end of its curvature, bending back towards the non-engaging side of the engagement elements, the hinge end terminating short of the non-engaging side to leave an open polar segment at the end of the hinge.

1 Claim, 5 Drawing Sheets

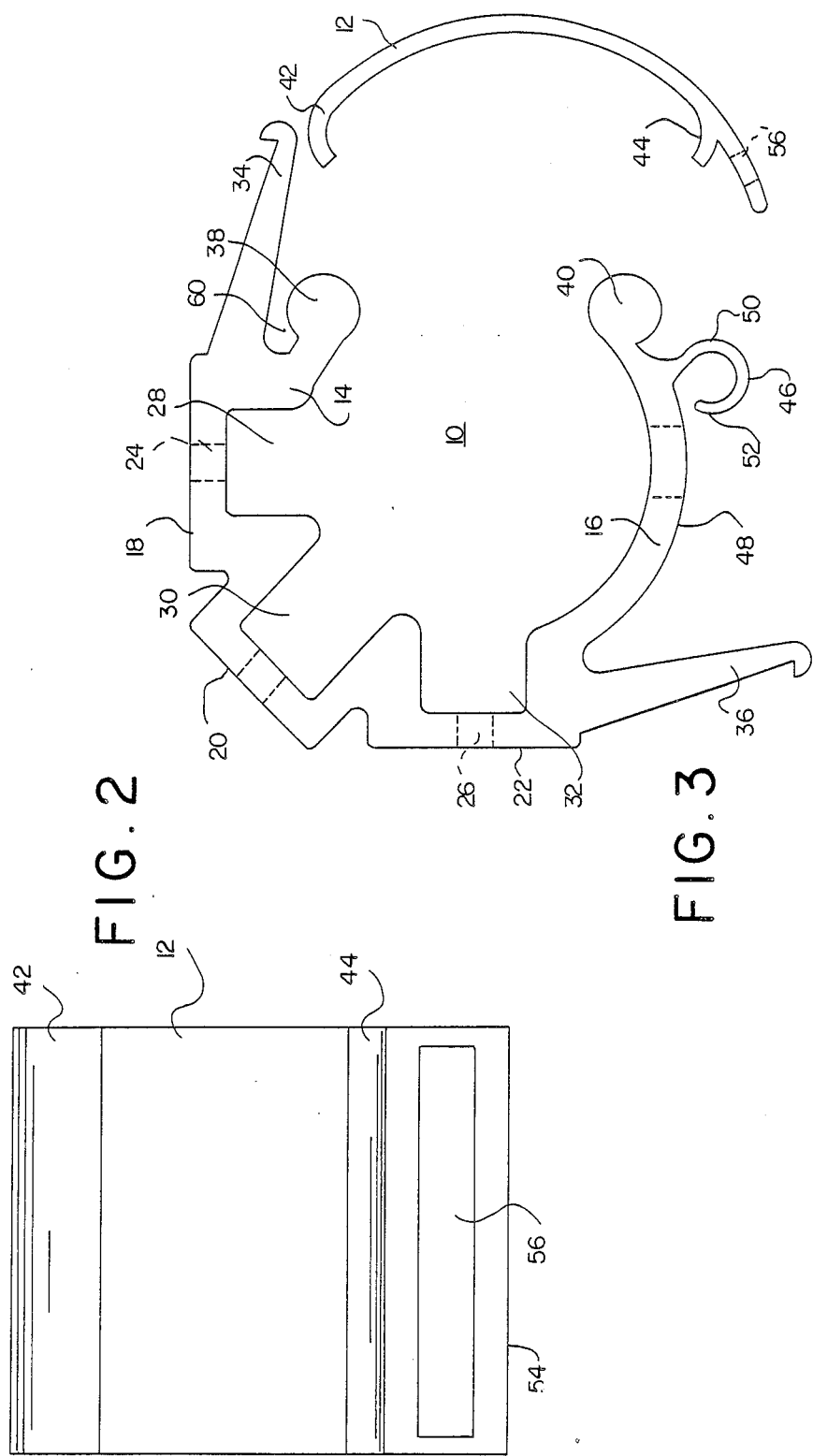

CONDUIT BRACKET LOCK SYSTEM

REFERENCE TO RELATED APPLICATION

This case is a continuation-in-part of Application Ser. No. 07/354,808 filed May 22, 1989, which is itself a continuation-in-part of Application Ser. No. 07/211,967, filed June 27, 1988, entitled Modular Conduit system, now U.S. Pat. Nos. 4,911,387 and 4,901,957, respectively.

BACKGROUND OF THE INVENTION

The present invention relates to a bracket and lock system for the securement, typically at elevated levels, at or near the level of a ceiling, of selected conduits including, without limitation, electrical and fluid conduits.

In the prior art, the securement of pipes in residential, commercial, and industrial environments has been a time consuming, tedious, and expensive undertaking. Further, the process of servicing such conduits, once installed, has also proven to be difficult, expensive, and time consuming.

There exists, in the prior art, various types of brackets having utility in the securement of one or another type of conduit. Such art, as is best known to the inventor, is reflected in U.S. Pat. No. 2,625,354 (1953) to Smith, entitled Pipe Supporting and Anchoring means; U.S. Pat. No. 3,295,805 (1967) to Modeme, entitled Two Part Clip for Attaching a Cylindrical Member to a Support; U.S. Pat. No. 4,079,786 (1978) to Moling, entitled Fire Extinguishing System; and U.S. Pat. No. 4,252,289 (1981) to Herb, entitled Two Part Pipe Clip. Relevant foreign prior art known to the Applicants consist of Swiss Patent No. 306,165 (1955) to Picart, entitled Bracket for the Fixation of Cables.

None of the above, nor other prior art known to the Inventors, discloses a modular conduit system in which the conduit may be nested within a bracket structure for the selective decoupling therefrom and which, further provides for the selective inclusion of insulation about the conduit shielded within a self-contained modular protective heat shield as an exterior plate. Prior art modular conduit systems do not enjoy the structural integrity, or the option of employing insulation, or the ease of installation, as is provided by the structure and system herein. Accordingly, components and systems that exist in the prior art are not practically functional as a heat shield as is the case in the system set forth herein.

The instant invention is formed completely of components which may be selectably coupled, as by snap fitting, together to form common connections between all components, thereof, thereby alleviating the need for much of the laborious aspects associated with installation of conduits and piping as has been known in the prior art.

It is in response to the above described limitations in the prior art that the present invention is directed.

Further, the instant invention constitutes a direct improvement of our co-pending Applications referenced above.

SUMMARY OF THE INVENTION

The instant invention defines a conduit bracket lock system, said system including constructional surface engagement means having radially projecting therefrom means for nestingly resiliently engaging a conduit, said engaging means comprising, at respective ends thereof, an integral cover plate holding element having, in radial cross-section, a substantially circular profile.

The inventive system further includes a reverse curvature hinge integrally depending from, and resiliently biased toward, a non-engaging side of said engagement means and, proximally to one of said holding elements, said hinge defining, in radial cross-section, a substantially circular loop curving initially away from said engaging means and away from said one proximal holding element and, at the end of its curvature, bending back towards said non-engaging side of said engagement means, however, said hinge end terminating short of said side to thereby leave an open polar segment at said end of said hinge.

The inventive conduit bracket lock system further includes a locking cover plate having a radial outer and radial inner side, said cover plate having an upper end and lower end, said upper end proportioned for complemental engagement with said circular end of said engagement means not provided with said hinge, and said lower end comprising a radially inwardly projecting element proportioned for complemental engagement with said circular end of said engaging means having said hinge; and below said inwardly projecting element but before the end thereof an opening proportioned for receipt of said end of said hinge when said open segment of said hinge is resiliently retracted and, in which, after said receipt, said hinge will contract into its normal resilient bias in the direction of said non-engaging side of said engagement means.

It is accordingly an object of the present invention to provide an improved conduit bracket lock system.

It is another object of the present invention to provide an improved conduit bracket lock system having particular utility in the suspension of electrical and fluid conduits at or near the line of intersection between walls and ceilings of residential, commercial and industrial structures.

It is another object of the present invention to provide a conduit bracket lock system particularly adapted for ease of installation and servicing of the secured conduit.

The above and yet other objects and advantages will become apparent in the hereinafter set forth Detailed Description of the Invention, The Drawings, and Claims appended herewith.

BRIEF DESCRIPTION OF THE DRAWING

FIG. 2 is a inner plan radial view of the locking cover plate of the inventive system.

FIG. 2 is a radial cross-section schematic view of the locking cover plate in relation to the constructional surface engagement bracket and integral reverse curvature hinge.

DETAILED DESCRIPTION OF THE INVENTION

Figure 1:
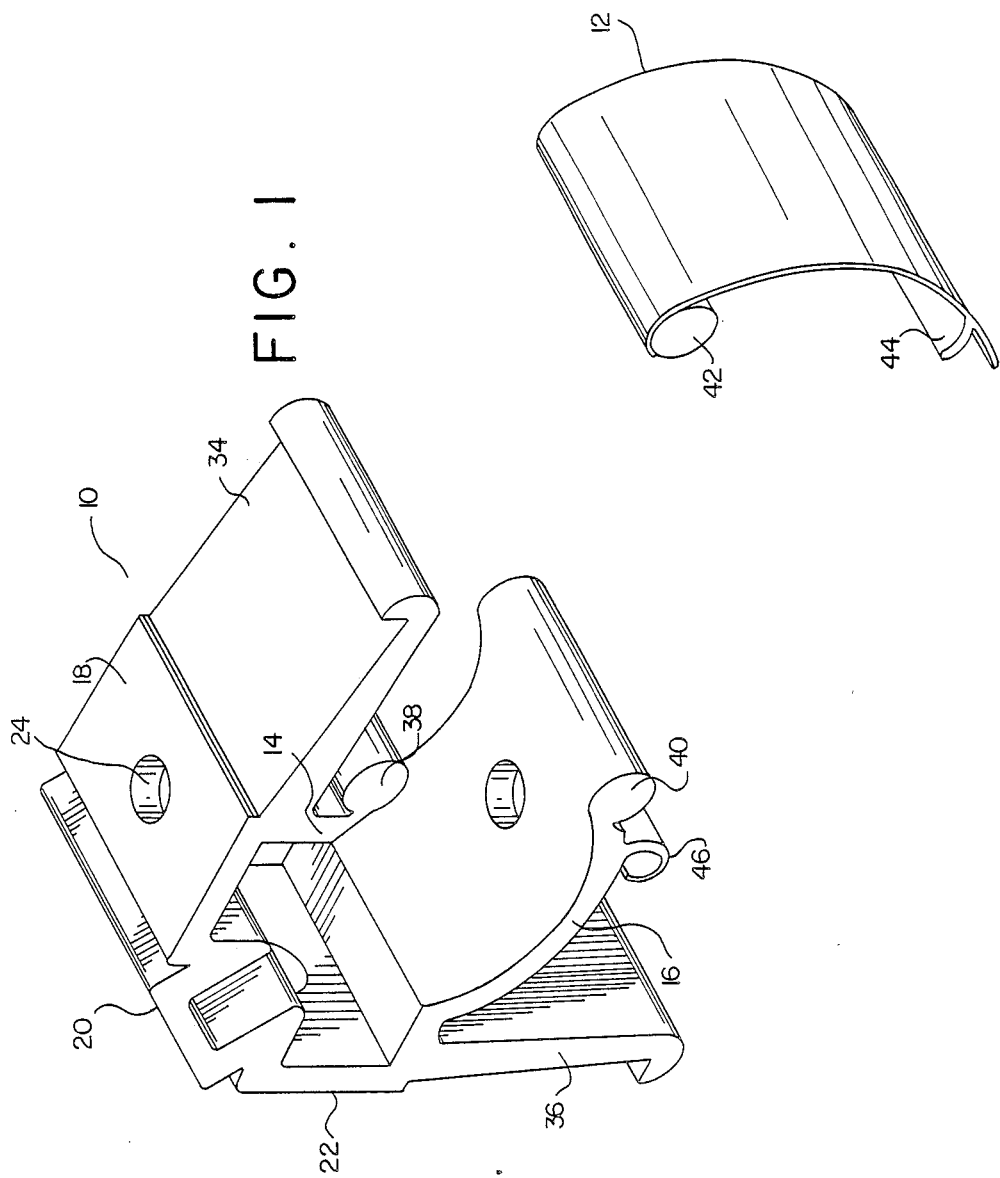
FIG. 1 is an exploded perspective view showing the constituent components of the inventive bracket lock system.

With reference to the exploded perspective view of FIG. 1, there is shown therein a constructional surface engagement bracket 10 and a locking cover plate 12. The bracket 10 is characterized by a first radially projecting element 14 and a second radial projecting element 16.

As may be more clearly noted in the view of FIG. 3, the radial interior surface of said projecting elements 14 and 16 are proportioned for complemental engagement of any conduit having a circular radial cross-sectional profile.

It is further noted that external radial surfaces 18, 20 and 22 of bracket 10 are provided with flat surfaces, the functions thereof being to effect engagement with either a wall (not shown), a ceiling (not shown) or, preferably, both a ceiling and wall so that surface 18 is flushed against the ceiling and surface 22 is flush against a wall. Holes 24 and 26 are proportioned to receive securing means such as screws to effect securement of surface 18 to the ceiling and surface 22. Where bracket 10 is so employed, surface 20 thereof will be unused and, as such, will be directed toward the linear intersection between the wall and ceiling. However, it is to be noted that, in other applications, as for example, when bracket 10 is not secured proximally to a ceiling-wall interface, surface 20 may be employed.

It is to be further noted that bracket 20 is provided with a plurality of radial hollow regions 28, 30 and 32 which operated to provide to the bracket 10, resilience and compressibility in the polar direction. In other words, hollow regions 28, 30 and 32 permit said projecting elements 14 and 16 to be "squeezed" toward the axial center of the bracket 10.

It is to be further noted that bracket 10 may, optionally, be provided with outer projecting arms 34 and 36, the function of which is to secure an exterior cover, which feature is more completely addressed in our earlier inventions, referenced above in the Background of the Invention.

Bracket 10 is further provided with upper male engagement means 38 and 40 which are proportioned for complemental engagement with female surfaces 42 and 44 of cover plate 12.

With further reference to the views of FIGS. 1 and 3, bracket 10 is seen to further include a reverse curvature hinge 46 integrally depending from bracket 10 and which is resiliently biased toward a non-engaging surface 48 of radially projecting element 16. Accordingly, said reverse curvature hinge 46 defines, in radial cross-section, a substantially circular loop which curves initially away, at region 50, from surface 48 of projecting element 16 and, at the end of its curvature, near region 52, bends back toward said non-engaging surface 48 of projecting element 16. However, as may be noted from the view of FIG. 3, reverse curvature hinge 46 terminates short of surface 48.

With further reference to cover plate 12, in the views of FIGS. 2 and 3 it should be noted that, said plate, at a lower end 54, is provided with a longitudinal opening 56 which is disposed just below said lower female engagement surface 44.

With reference to the operational views of FIGS. 4 thru 9, it is to be noted that, to begin the process of securing cover plate 12 to projecting element 16 of bracket 10, a lower end 54 of cover element 12 is positioned proximally to area 52 of reverse curvature hinge 46. See FIG. 4.

Figure 5:
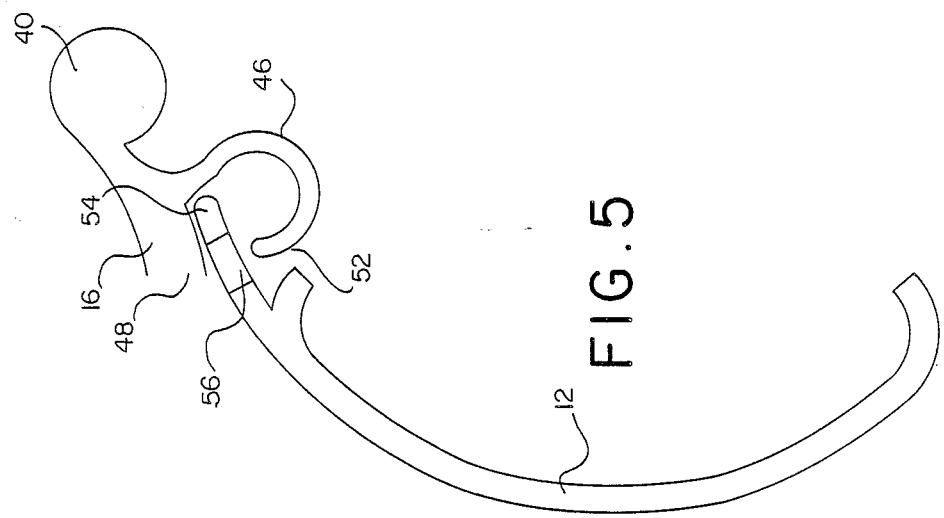
FIGS. 5 thru 9 comprise a sequence of operational views showing the sequence of steps which are employed to lock the cover plate system relative to the reverse curvature hinge and surface engagement bracket of the invention.
Figure 4:
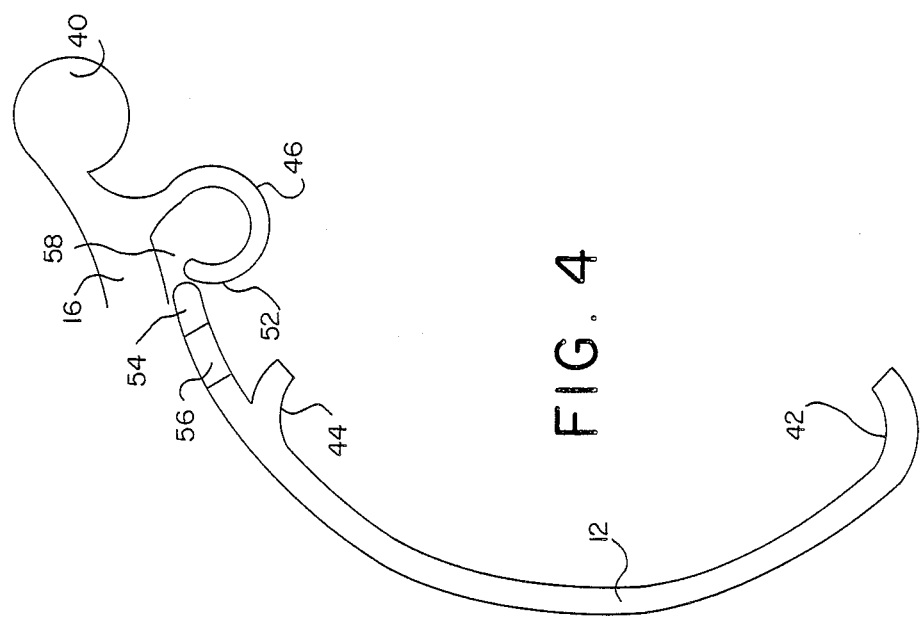

With reference to FIG. 5, it is seen that the second step in the use of said reverse curvature hinge is the insertion of end 54 of cover into longitudinal opening 58 of reverse curvature hinge 46. As may be noted, said longitudinal opening 58 exists between end region 52 of hinge 46 and surface 48 of projecting element 16. From the view of FIG. 5, it is to be appreciated that the end of region 52 of hinge 46 is aligned with longitudinal opening 56 of cover plate 12.

Figure 6:
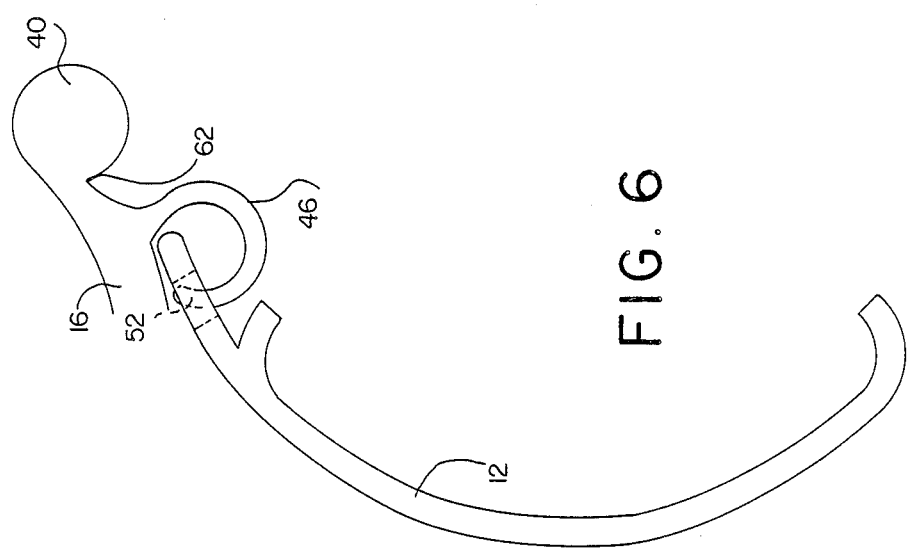

With reference to the next sequential view, namely, the view of FIG. 6, it is seen that end 52 of curvature hinge 46 is inserted within opening 56 of cover plate 12.

Figure 7:
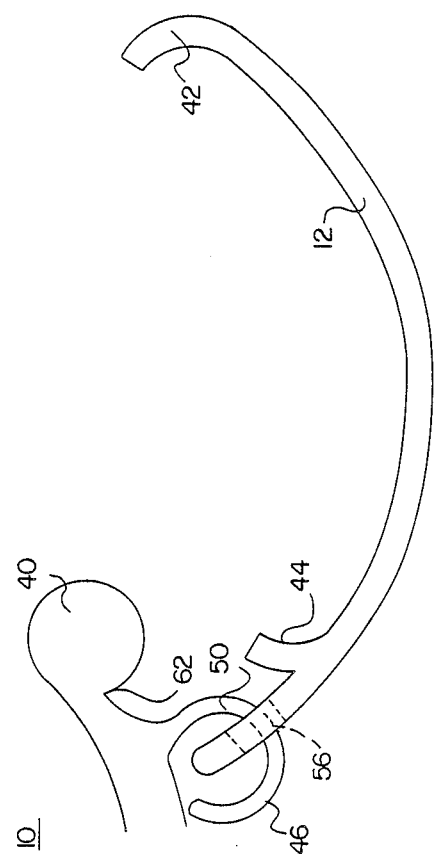

With reference to the view of FIG. 7, it is noted that cover plate 12 is then rotated in a counter clockwise direction such that longitudinal opening 56 of plate 12 reaches region 50 of hinge 46.

Figure 8:
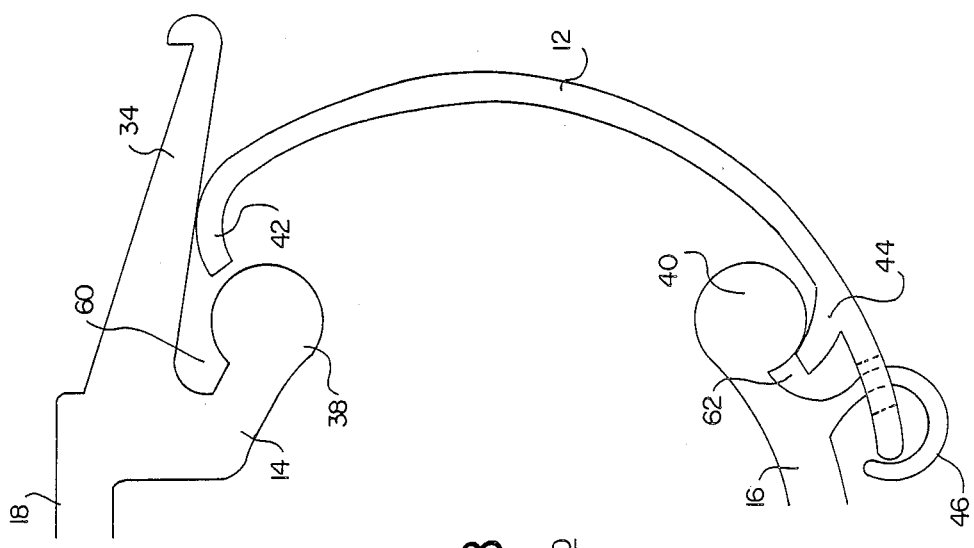

With reference to the view of FIG. 8, it is noted that cover 12 is further rotated until female surface 44 of plate 12 engages male element 40 of projecting element 16. Further, female surface 42 of plate 12 is positioned proximally to upper male element 38 of radially projecting element 14 and placed into abutment with projecting arm 34.

Figure 9:
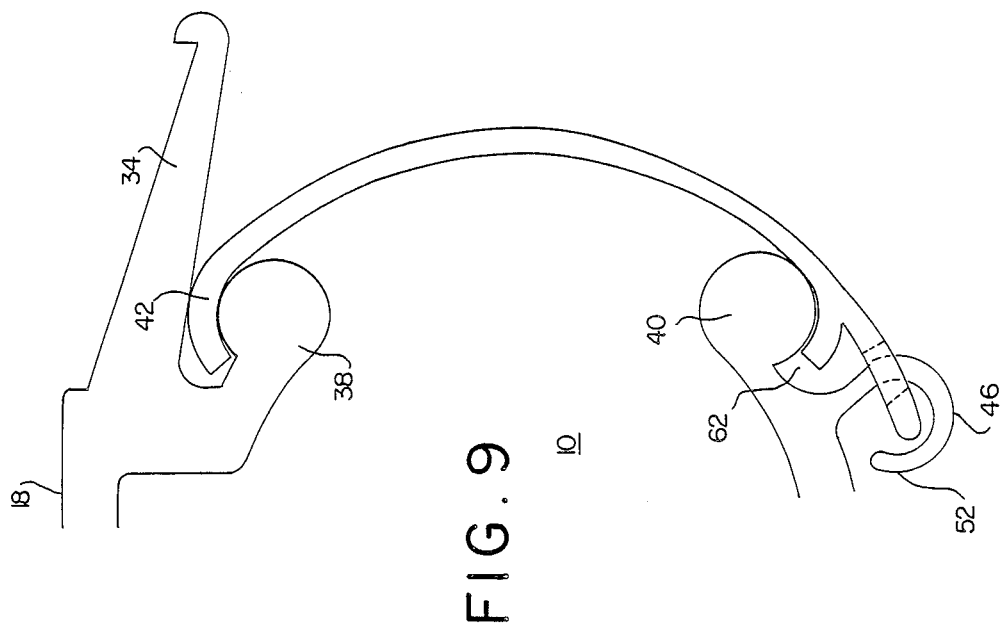

With reference to the operational view of FIG. 9, it is noted that female surface 42 of cover plate 12 is fully inserted within a region 60 between complemental male element 38 and upper projecting element 34, while lower female surface 44 of plate 12 is complementally secured within a region 62 which is defined between lower male engagement means 40 and the outer surface or reverse hinge 46 which is opposite to region 52 of hinge 46. Accordingly, it is to be appreciated that after the steps illustrated in FIGS. 4 thru 9 have been effected, any conduit placed into the central circular cross-sectional area of bracket 10 will be firmly secured between complemental engaging elements 14 and 16.

Should it become necessary to service a conduit held within bracket 10, projecting element 34 may be rotated into a counter clockwise direction thereby releasing female surface 42 relative to complemental male surface 38 of element 14 in order to, thereby, achieve the release of plate 12 relative to bracket 10 shown in FIG. 8. The position of FIG. 7 may be easily attained. At that point, male engagement means 38 and 40 may be pulled away from each other to effect the escape of the conduit held within the bracket 10.

Alternately, region 54 of reverse hinge 46 may be pulled downward sufficiently to release longitudinal opening 56 of plate 12.

Accordingly, while there has been shown and described the preferred embodiment of the present invention, it is to be appreciated that the invention may be embodied otherwise than is herein specifically shown and described and that, within said embodiment, certain changes may be effected in the form and arrangement of the part without departing from the underlying principles of this invention set forth in the Claims appended herewith.

Having thus described our invention, what we claim as new, useful and non-obvious and accordingly, secure by Letters Patent of the United States is:

1. A conduit bracket lock system, comprising:
 (a) a constructional surface engagement means having, radially projecting therefrom, means for nestingly resiliently engaging a conduit, said engaging means comprising, at respective transverse ends thereof, integral cover plate holding elements having, in radial cross-section, a substantially circular profile;
 (b) a reverse curvature hinge integrally depending from, and resiliently biased toward, a non-engaging side of said engaging means and, proximally to one of said engaging means, a hinge, said hinge defining, in the radial cross-section, a substantially circular loop curving initially away from said engaging means and, at the end of its curvature, bending back towards said non-engaging side of said engagement means, however, terminating short of said non-engaging side of said engagement means, thereby leaving an open polar segment at said end of said hinge; and (c) a locking cover plate having a radial outer and radial inner side, said plate having an upper end and a lower end, said upper end proportioned for complemental engagement with said circular end of said engagement means which is not provided with said hinge, and said lower end of said cover plate comprising:

(i) a radially inwardly projecting element proportioned for complemental engagement with said circular end of said engagement means which is provided with said reverse curvature hinge; and (ii) below said inwardly projecting, element providing, before said lower end thereof, an opening proportioned for receipt of said end of said hinge when said open polar segment of said hinge is resiliently retracted and in which, after said receipt, said hinge will contract into its normal resilient in and the direction of said non-engaging side of said engagement means.

* * * * *